(12) United States Patent
Ukon et al.

(10) Patent No.: US 9,234,562 B2
(45) Date of Patent: Jan. 12, 2016

(54) DAMPER DEVICE

(71) Applicant: Fuji Jukogyo Kabushiki Kaisha, Tokyo (JP)

(72) Inventors: Yasuyuki Ukon, Tokyo (JP); Mamoru Murakami, Tokyo (JP); Yuuki Suzuki, Tokyo (JP); Tsuyoshi Shinohara, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/198,449

(22) Filed: Mar. 5, 2014

(65) Prior Publication Data

US 2014/0274562 A1  Sep. 18, 2014

(30) Foreign Application Priority Data

Mar. 13, 2013  (JP) .................................. 2013-050701
Mar. 13, 2013  (JP) .................................. 2013-050703

(51) Int. Cl.

| F16F 15/14 | (2006.01) |
|---|---|
| F16D 13/38 | (2006.01) |
| F16H 47/08 | (2006.01) |
| B60K 17/346 | (2006.01) |
| F16H 1/28 | (2006.01) |

(52) U.S. Cl.
CPC .......... F16F 15/1478 (2013.01); F16D 13/385 (2013.01); B60K 17/3467 (2013.01); F16H 1/28 (2013.01); F16H 47/08 (2013.01); Y10T 477/753 (2015.01)

(58) Field of Classification Search
CPC .................................................. F16F 15/1478
USPC ............................................................ 475/35
See application file for complete search history.

(56) References Cited

U.S. PATENT DOCUMENTS

| 4,286,477 A * | 9/1981 | Meyerle et al. .................. 475/82 |
| 4,856,639 A * | 8/1989 | Fukushima ................ 192/55.61 |
| 2013/0068580 A1 * | 3/2013 | Doegel et al. ................ 192/3.28 |
| 2013/0244800 A1 | 9/2013 | Sakai et al. |
| 2014/0274561 A1 * | 9/2014 | Ukon et al. ................... 477/175 |

FOREIGN PATENT DOCUMENTS

WO   WO 2012/066680   5/2012

* cited by examiner

*Primary Examiner* — Justin Holmes
*Assistant Examiner* — David Morris
(74) *Attorney, Agent, or Firm* — McGinn IP Law Group PLLC

(57) ABSTRACT

A damper device is provided between an engine and a transmission and has a torque distribution mechanism that is provided with a first input element connected to the engine, a second input element connected to the engine via a first elastic member, a first output element connected to transmission, and a second output element connected to the transmission via a second elastic member. The damper device further has a first clutch that is provided between the first output element and the transmission and that is switched between an engaged state of connecting the first output element to the transmission and a released state of disconnecting the first output element from the transmission, and a second clutch that is provided between the second output element and the transmission and that is switched between an engaged state of connecting the second output element to the transmission and a released state of disconnecting the second output element from the transmission.

20 Claims, 16 Drawing Sheets

Page US 9,234,562 B2

DAMPER DEVICE

CROSS-REFERENCE TO RELATED APPLICATIONS

The present application claims priority from Japanese Patent Application No. 2013-050701 and 2013-050703, both filed on Mar. 13, 2013, the entire contents of which are hereby incorporated by reference.

BACKGROUND

1. Technical Field

The present invention relates to a damper device that is disposed between an engine and a transmission.

2. Related Art

A damper device is disposed between an engine and a transmission in order to reduce torsional vibration that is transmitted from the engine to the transmission. For example, a damper has been proposed that comprises two flywheels connected to each other via a spring (see PCT International Publication No. WO 2012/66680 A1).

The connection of the two flywheels via the spring can suppress the torsional vibration of the engine.

Damper devices are designed so as to exclude a resonance point (natural frequency) of the damper device from a normal region of engine revolutions, through adjustment of the mass and spring constant of the various members that make up the damper device. Through mere adjustment of masses and spring constants in the damper device, however, it is difficult to exclude the resonance point of the damper device from a wide region, extending from a low-revolutions region to a high-revolutions region. Accordingly, it is difficult to suppress torsional vibration of the engine over a wide region in cases where conventional damper devices are used.

SUMMARY OF THE INVENTION

The present invention has been designed in consideration of the circumstances described above, and an object thereof is to suppress engine torsional vibration over a wide region.

An aspect of the present invention provides a damper device that is disposed between an engine and a transmission, the damper device having: a torque distribution mechanism comprising a first input element connected to the engine, a second input element connected to the engine via a first elastic member, a first output element connected to the transmission, and a second output element connected to the transmission via a second elastic member; a first clutch disposed between the first output element and the transmission, and switched between an engaged state of connecting the first output element to the transmission and a released state of disconnecting the first output element from the transmission; and a second clutch disposed between the second output element and the transmission, and switched between an engaged state of connecting the second output element to the transmission and a released state of disconnecting the second output element from the transmission.

DETAILED DESCRIPTION

Figure 1:
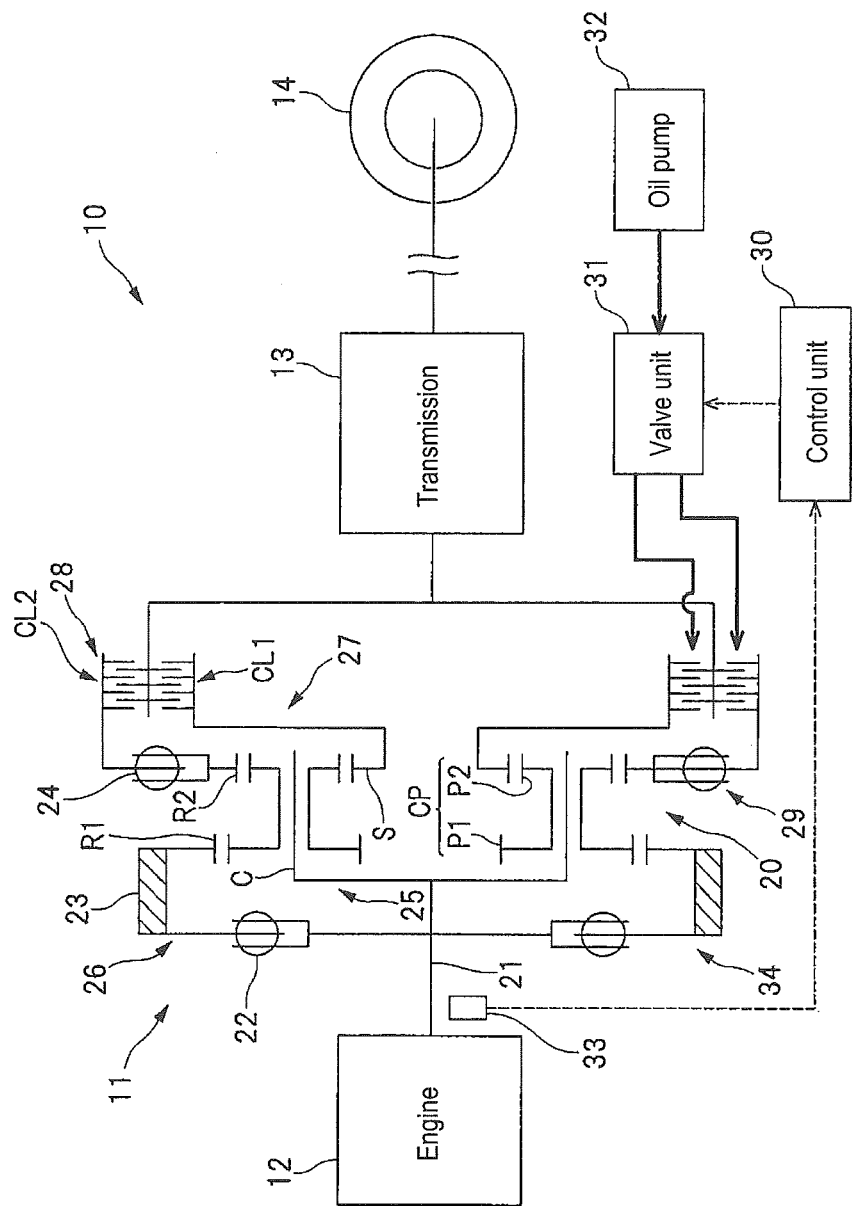
FIG. 1 is a schematic diagram illustrating a power unit that is provided with a damper device being a first implementation of the present invention.
Figure 2:
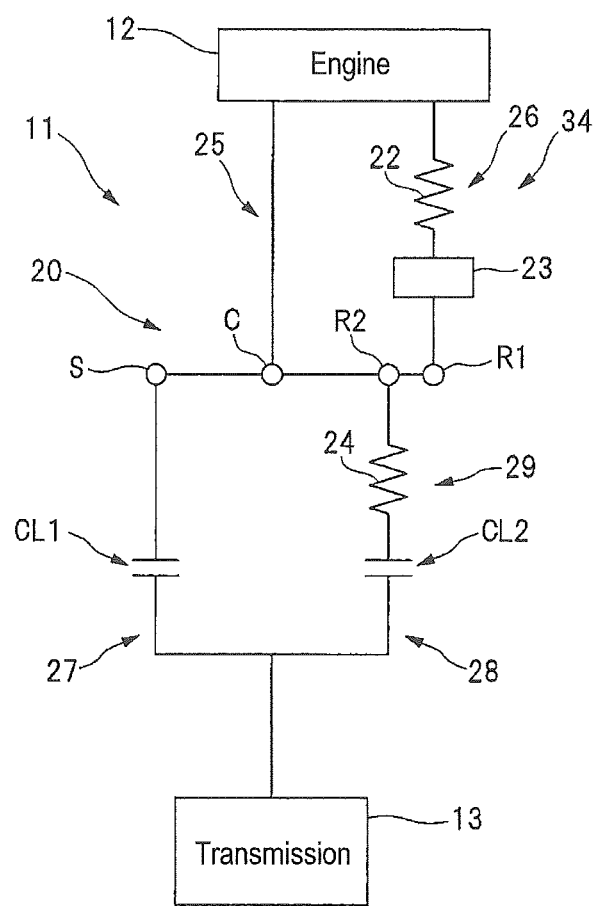
FIG. 2 is an explanatory diagram illustrating a structure model of the damper device built into the power unit.
Figure 3:
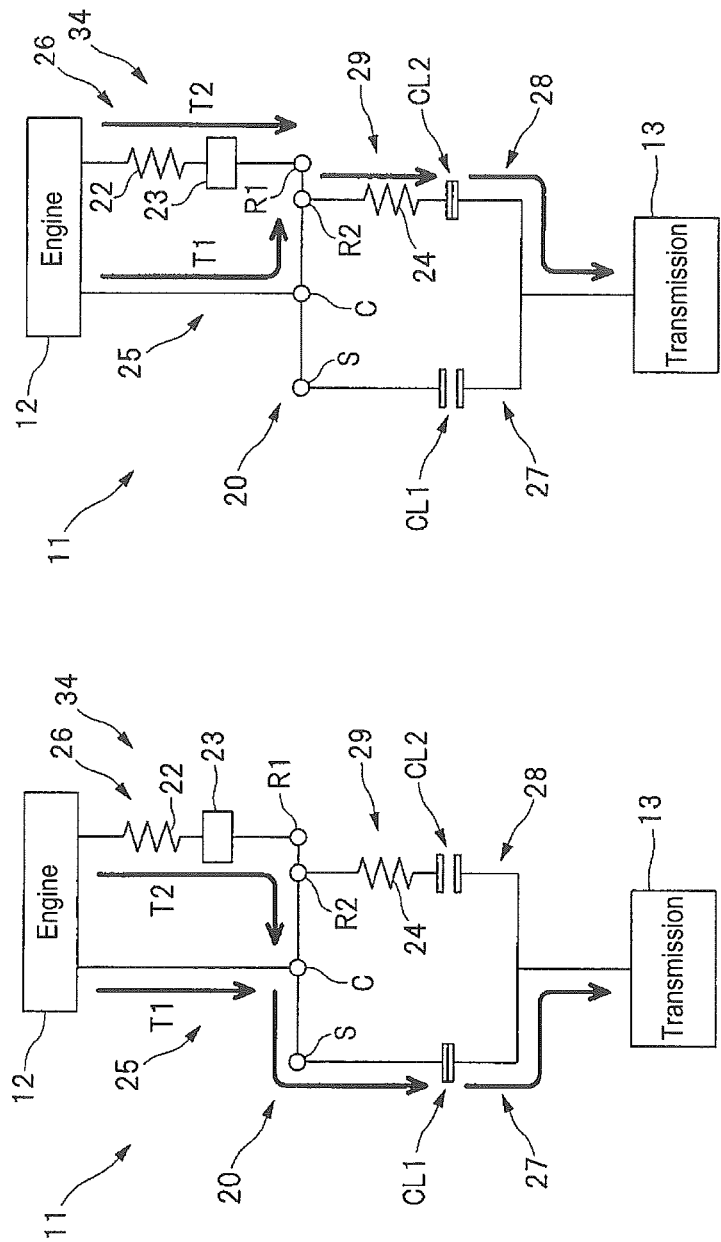
FIG. 3A and FIG. 3B are explanatory diagrams illustrating instances of transmission of engine torque.

Implementations of the present invention are explained in detail next with reference to accompanying drawings. FIG. 1 is a schematic diagram illustrating a power unit 10 that is provided with a damper device being a first implementation of the present invention. FIG. 2 is an explanatory diagram illustrating a structure model of the damper device 11 that is built into the power unit 10. FIG. 3A and FIG. 3B are explanatory diagrams illustrating instances of transmission of engine torque. As illustrated in FIG. 1, the power unit 10 has an engine 12, being an internal combustion engine, and a transmission 13 that is connected to the engine 12 via the damper device 11. Thus, the damper device 11 is disposed between the engine 12 and the transmission 13, such that torsional vibration derived from vibration forces of the engine 12 is damped using the damper device 11. As used herein, the term torsional vibration of the engine 12 denotes torque variation derived from, for instance, unbalanced inertial forces and combustion vibration forces that act upon a crankshaft 21 of the engine 12. A drive wheel 14 is connected to the transmission 13 via a differential device and so forth, not shown.

As illustrated in FIG. 1 and FIG. 2, the damper device 11 comprises a torque distribution mechanism (planetary gear mechanism) 20 made up of a compound planetary gear train. The torque distribution mechanism 20 comprises a carrier (first input element) C connected with the crankshaft 21, and a first ring gear (second input element) R1 connected to the crankshaft 21 via a first spring (first elastic member) 22. An inertia member 23 having a predetermined mass is fixed to the first ring gear R1 that is connected to the crankshaft 21 via the first spring 22. The torque distribution mechanism 20 comprises a sun gear (first output element) S connected to the transmission 13, and a second ring gear (second output element) R2 connected to the transmission 13 via a second spring (second elastic member) 24. Further, a compound pinion gear CP, having a first pinion gear P1 and a second pinion gear P2 integrally formed with each other, is rotatably supported on the carrier C. The first pinion gear P1 meshes with the first ring gear R1, and the second pinion gear P2 meshes with the second ring gear R2 and the sun gear S.

The torque distribution mechanism 20 is provided thus with two input paths 25 and 26 through which the engine torque is inputted, and two output paths 27 and 28 through which the engine torque is outputted. Specifically, the torque distribution mechanism 20 is provided with a first input path 25 through which the engine torque is inputted to the carrier C, and with a second input path 26 through which the engine torque is inputted to the first ring gear R1 via the first spring 22. By virtue of the first spring 22 being disposed thus in the second input path 26, the first spring 22 can as a result be stretched and compressed in response to the torsional vibration of the engine 12, and the carrier C and the first ring gear R1 can be caused to rotate relatively to each other. The torque distribution mechanism 20 is provided with a first output path 27 through which the engine torque is outputted from the sun gear S, and with a second output path 28 through which the engine torque is outputted from the second ring gear R2 via the second spring 24. Providing thus the second spring 24 in the second output path 28 allows bringing down the resonance point (natural frequency) of a vibration system 29 that comprises the second ring gear R2, from a high frequency region to a low frequency region, as described below. The input paths 25, 26 and the output paths 27, 28 are made up of rotating shafts, hub members, drum members and so forth.

A first clutch CL1 that is switched between an engaged state and a released state is provided between the sun gear S and the transmission 13. The sun gear S becomes connected to the transmission 13 through switching of the first clutch CL1 to the engaged state, and the sun gear S becomes disconnected from the transmission 13 through switching of the first clutch CL1 to the released state. In the case where the first clutch CL1 is switched to the engaged state, as illustrated in FIG. 3A, engine torques T1 and T2 that are distributed over the first input path 25 and the second input path 26 are combined via the torque distribution mechanism 20, and thereafter, the engine torques T1 and T2 are outputted through the sun gear S and the first output path 27 to the transmission 13. The distribution ratio between the engine torque T1 and the engine torque T2 for canceling out the torque variation of the engine torque T1 is set on the basis of the number of teeth of the first ring gear R1, the first pinion gear P1, the second pinion gear P2 and the sun gear S.

Similarly, a second clutch CL2 that is switched between an engaged state and a released state is provided between the second ring gear R2 and the transmission 13. The second ring gear R2 becomes connected to the transmission 13 through switching of the second clutch CL2 to the engaged state, and becomes disconnected from the transmission 13 through switching of the second clutch CL2 to the released state. In the case where the second clutch CL2 is switched to the engaged state, as illustrated in FIG. 3B, the engine torques T1 and T2 that are distributed over the first input path 25 and the second input path 26 are combined via the torque distribution mechanism 20, and thereafter, the engine torques T1 and T2 are outputted through the second ring gear R2 and the second output path 28 to the transmission 13. The distribution ratio between the engine torque T1 and the engine torque T2 for canceling out the torque variation of the engine torque T1 is set on the basis of the number of teeth of the first ring gear R1, the first pinion gear P1, the second pinion gear P2 and the second ring gear R2.

As illustrated in FIG. 1, a control unit 30 that functions as a clutch controller is provided in the power unit 10, with a view to controlling the first clutch CL1 and the second clutch CL2 of the damper device 11. The power unit 10 is provided with a valve unit 31 that comprises a plurality of electromagnetic valves, and with an oil pump 32 that pumps hydraulic oil towards the valve unit 31. An engine revolutions sensor 33 that detects the rotational speed (hereafter notated as engine revolutions) of the crankshaft 21 is connected to the control unit 30. The control unit 30 selects the clutch CL1 or CL2, whichever is to be switched to the engaged state, on the basis of the engine revolutions detected by the engine revolutions sensor 33, and outputs a control signal to the valve unit 31. On the basis of the engine revolutions, specifically, the control unit 30 switches the first clutch CL1 or the second clutch CL2 to the engaged state, and selects thereby the output path 27 or 28 for extracting the engine torque. The control unit 30 is made up of, for instance, a CPU that computes control signals and the like, a ROM that stores a control program, arithmetic expressions, map data and the like, and a RAM that stores data temporarily.

Figure 4:
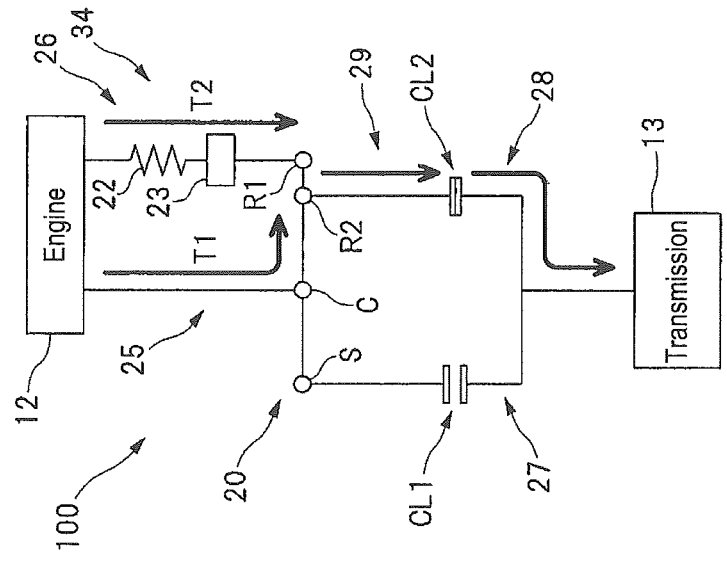
FIG. 4 is an explanatory diagram illustrating the structure model of the damper device, wherein a second spring is omitted from a second output path.
Figure 5:
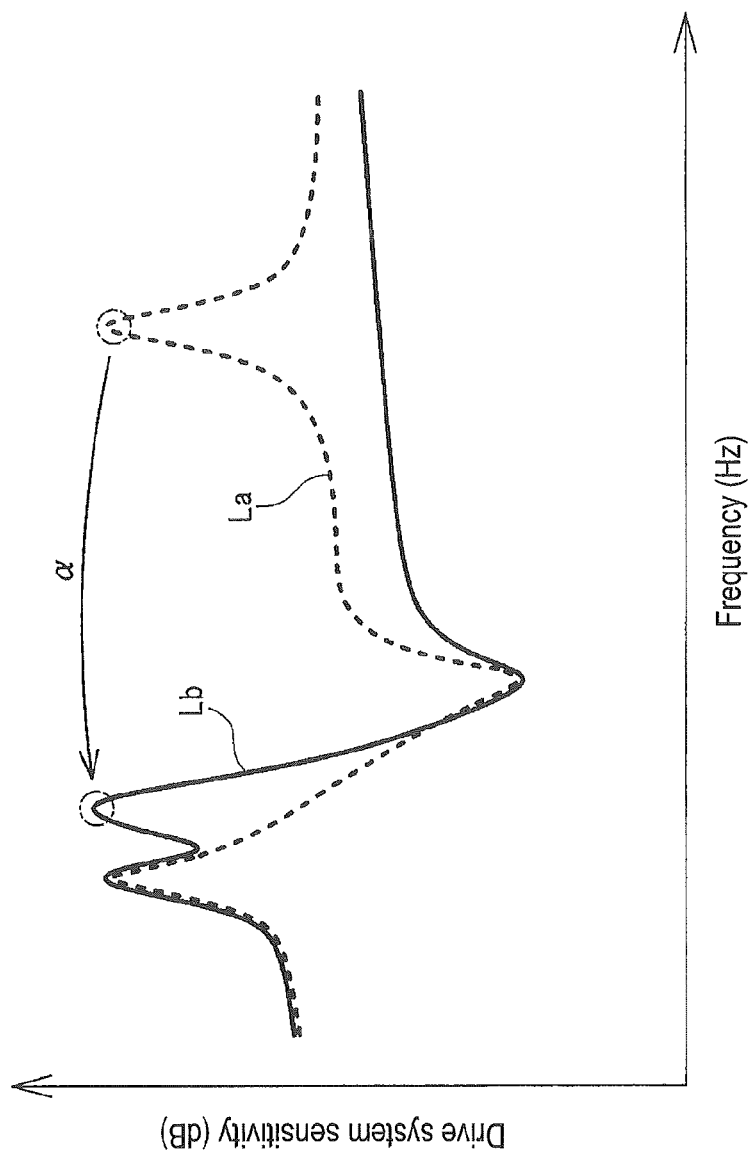
FIG. 5 is an image diagram illustrating a damping characteristic of torsional vibration outputted through the second output path.

FIG. 4 is an explanatory diagram illustrating a structure model of a damper device 100, as a comparative example, in which the second spring 24 has been omitted from the second output path 28. In FIG. 4, members that are illustrated in FIG. 3B and members identical to those illustrated in FIG. 3B are denoted by identical reference symbols, and a recurrent description thereof will be omitted. FIG. 5 is an image diagram illustrating a damping characteristic of torsional vibration outputted through the second output path 28. In FIG. 5, the abscissa axis represents vibration frequency, i.e. the frequency, of torsional vibration, and the ordinate axis represents drive system sensitivity, being the vibration acceleration level of torsional vibration. In FIG. 5, a characteristic line La represented by a dotted line denotes the damping characteristic of torsional vibration outputted through the second output path 28 of the structure model described FIG. 4. In FIG. 5, a characteristic line Lb represented by a solid line denotes the damping characteristic of torsional vibration outputted through the second output path 28 of the structure model described FIG. 3B above.

In the case where the second spring 24 is omitted from the second output path 28, as illustrated in FIG. 4, the torsional vibration is damped at a medium frequency region, but is amplified at a low frequency region and a high frequency region, as indicated by the characteristic line La in FIG. 5. A resonance point of a vibration system 34 comprising the first spring 22, the first ring gear R1 and the inertia member 23 is present at the low frequency region. The presence of this resonance point is one cause of amplification of torsional vibration at the low frequency region. A resonance point of the vibration system 29 comprising the second ring gear R2, the mass whereof increases readily, is present at the high frequency region. The presence of this resonance point is one cause of amplification of torsional vibration at the high frequency region. By contrast, in the case where the second spring 24 is disposed in the second output path 28, as illustrated in FIG. 3B, torsional vibration is amplified at the low frequency region, but can be damped at the medium frequency region and the high frequency region, as indicated by the characteristic line Lb in FIG. 5. That is, the resonance point of the vibration system 29 comprising the second ring gear R2 can be brought down from the high frequency region to the low frequency region, as indicated by arrow a in FIG. 5, by providing the second spring 24 in the second output path 28.

Figure 6:
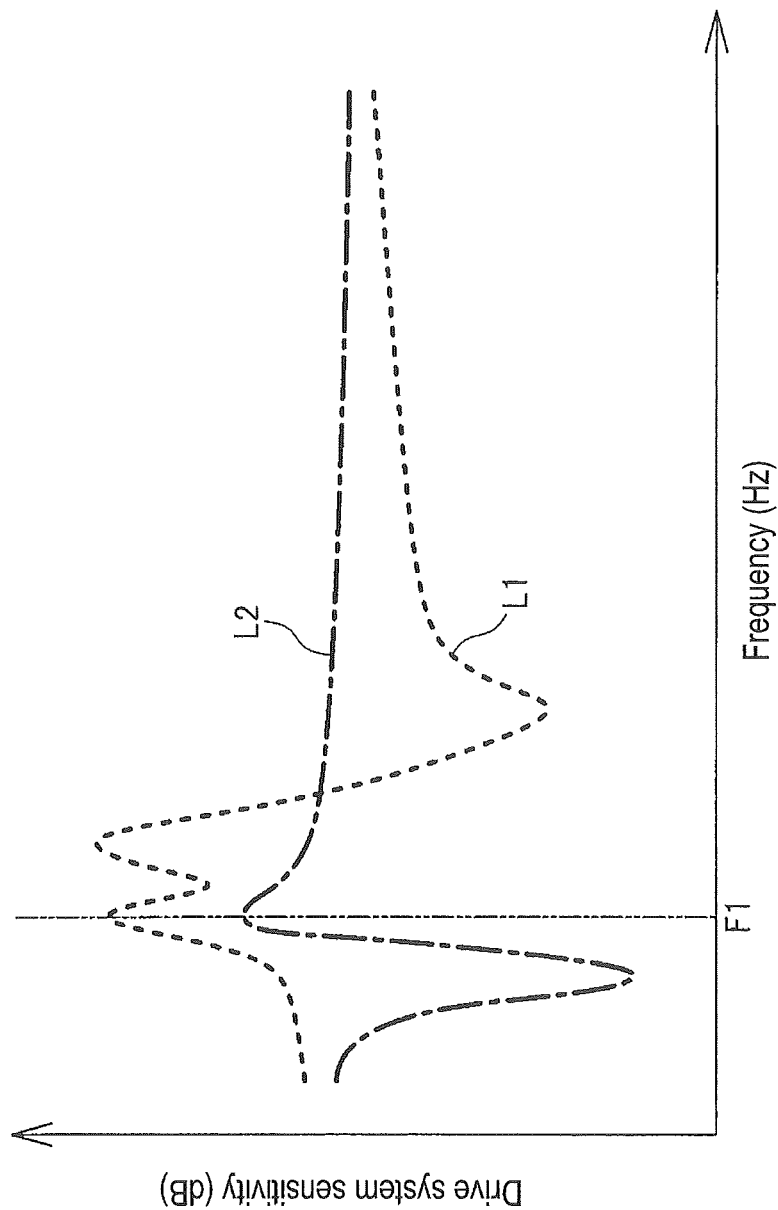
FIG. 6 is an image diagram illustrating a damping characteristic of torsional vibration by the damper device.

Next, FIG. 6 is an image diagram illustrating a torsional vibration damping characteristic of the damper device 11. In FIG. 6, a characteristic line L1 represented by a dotted line is the characteristic line Lb illustrated in FIG. 5, and denotes the damping characteristic of torsional vibration outputted from the second ring gear R2. In FIG. 6, a characteristic line L2 represented by a dot-chain line denotes the damping characteristic of torsional vibration outputted from the sun gear S.

In the case where the engine torque is outputted from the second ring gear R2 through engagement of the second clutch CL2, torsional vibration is amplified at the low frequency region but is damped at a medium-high frequency region, as indicated by the characteristic line L1 in FIG. 6. Specifically, the rotation phase of the crankshaft 21 and the rotation phase of the first ring gear R1 have the same direction at the low frequency region that is below a resonance point F1 of the vibration system 34. That is, the rotation phase of the crankshaft 21 and the rotation phase of the second ring gear R2 have the same direction; as a result the crankshaft 21 and the second ring gear R2 vibrate at the same phase, and torsional vibration is amplified, in the case where the engine torque is outputted from the second ring gear R2 at the low frequency region. By contrast, the rotation phase of the crankshaft 21 and the rotation phase of the first ring gear R1 have opposite directions at the medium-high frequency region beyond the resonance point F1 of the vibration system 34. That is, the rotation phase of the crankshaft 21 and the rotation phase of the second ring gear R2 have opposite directions; as a result, the crankshaft 21 and the second ring gear R2 vibrate at opposite phases, and torsional vibration is damped, in the case where the engine torque is outputted from the second ring gear R2 at the medium-high frequency region.

As indicated by the characteristic line L2 in FIG. 6, the amplification amount of torsional vibration is curtailed to a greater degree than for the characteristic line L1, at the low frequency region, and the damping amount of torsional vibration is curtailed to a greater degree than for the characteristic line L1, at the medium-high frequency region, in the case where the engine torque is outputted from the sun gear S through engagement of the first clutch CL1. As described above, the rotation phase of the crankshaft 21 and the rotation phase of the first ring gear R1 have the same direction at the low frequency region that is below the resonance point F1 of the vibration system 34. That is, the rotation phase of the crankshaft 21 and the rotation phase of the sun gear S have opposite directions; as a result, the amplification amount of torsional vibration is curtailed to a greater degree as compared with that of the characteristic line L1, in the case where the engine torque is outputted from the sun gear S, at the low frequency region. By contrast, the rotation phase of the crankshaft 21 and the rotation phase of the first ring gear R1 have opposite directions at the medium-high frequency region beyond the resonance point F1 of the vibration system 34. That is, the rotation phase of the crankshaft 21 and the rotation phase of the sun gear S have the same direction; as a result, the damping amount of torsional vibration is curtailed to a greater degree as compared with that of the characteristic line L1, in the case where the engine torque is outputted from the sun gear S, at the medium-high frequency region.

As illustrated in FIG. 6, a difference in damping characteristic of torsional vibration arises thus between an instance where the engine torque is outputted from the second ring gear R2, and in an instance where the engine torque is outputted from the sun gear S. Specifically, the distribution ratios of the engine torques T1 and T2 that are distributed over the first input path 25 and the second input path 26 are different between an instance where the engine torque is outputted through the first output path 27 and an instance where the engine torque is outputted through the second output path 28. A difference arises as a result in the damping characteristic of torsional vibration. In the configuration illustrated in the figure, in particular, the rotation directions of the second ring gear R2 and the sun gear S are different in the case where the compound pinion gear CP rotates while the first spring 22 is stretched and compressed. As a result, a significant difference arises in the damping characteristic of torsional vibration.

Figure 7:
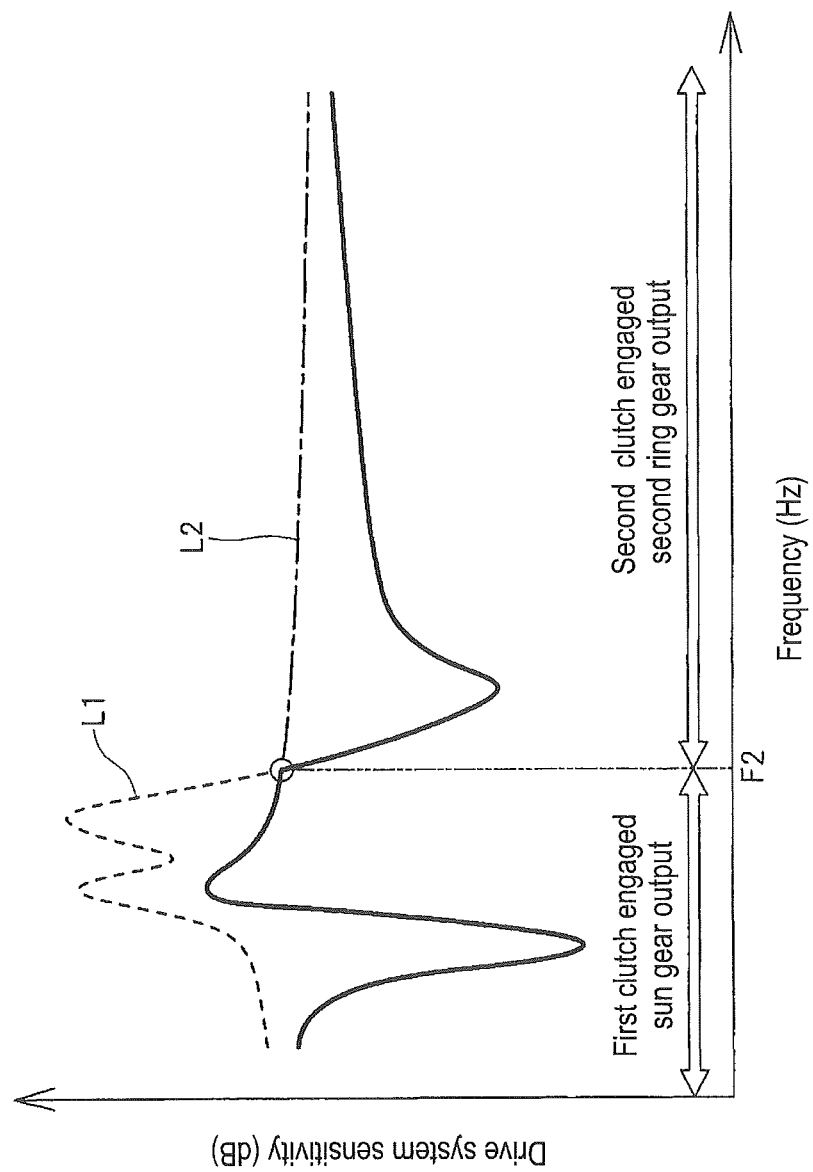
FIG. 7 is an explanatory diagram illustrating a control state of a first clutch and a second clutch.

The damping characteristic can be thus modified through switching between the output paths 27, 28. Accordingly, the control unit 30 switches the first clutch CL1 or the second clutch CL2 to the engaged state on the basis of the frequency of torsional vibration, i.e. on the basis of engine revolutions. FIG. 7 is an explanatory diagram illustrating a control state of the first clutch CL1 and the second clutch CL2. As illustrated in FIG. 7, the first clutch CL1 is engaged, and the engine torque is outputted from the sun gear S, at a frequency region below a frequency F2 at which the characteristic lines L1 and L2 intersect, i.e. at a region at which engine revolutions are below reference revolutions corresponding to the frequency F2 of torsional vibration. On the other hand, the second clutch CL2 is engaged, and the engine torque is outputted from the second ring gear R2, at a frequency region beyond the frequency F2, i.e. at a region at which engine revolutions exceed the reference revolutions corresponding to the frequency F2 of torsional vibration.

As thus explained, a favorable damping characteristic can be obtained over the entire frequency region, as illustrated by the bold line in FIG. 7, through switching of the clutches CL1 and CL2 to the engaged state, on the basis of engine revolutions. In particular, the resonance point of the vibration system 29 can be brought down from the high frequency region to the low frequency region by providing the second spring 24 in the second output path 28. Specifically, the resonance point of the vibration system 29 can be shifted out of the low frequency region at which the second clutch CL2 is brought to the released state, i.e. out of the use region. It becomes accordingly possible to achieve a good damping characteristic of torsional vibration over the entire frequency region. As explained above, the torsional vibration of the engine 12 can be curtailed by the damper device 11, and, as a result, vehicle quality can be enhanced through suppression of vibration and noise. The load that acts on the transmission 13 can be reduced, and the durability of the transmission 13 can be enhanced, through curtailment of the torsional vibration of the engine 12. By virtue of the curtailed vibration of the engine 12, the number of cylinders of the engine 12 can be reduced, the use region of engine revolutions can be lowered, and the fuel efficiency of the vehicle can be enhanced.

In the instance illustrated in the figure, the carrier C is set to function as a first input element, and the first ring gear R1 is set to function as a second input element, but the implementation is not limited thereto. For instance, the first ring gear R1 may be connected directly with the crankshaft 21, and the carrier C may be connected to the crankshaft 21 via the first spring 22. In this case, the first ring gear R1 functions as the first input element, and the carrier C functions as the second input element. By providing the sun gear that meshes with the first pinion gear P1, the sun gear may be set to function as the first input element (or second input element). Thus, the first ring gear R1 may be set to function as the second input element (or first input element), and the carrier C may be set to function as the second input element (or first input element), in the case where the sun gear that meshes with the first pinion gear P1 is set to function as the first input element (or second input element). In the instance illustrated in the figure, the sun gear S is set to function as the first output element and the second ring gear R2 is set to function as the second output element, but the implementation is not limited thereto. For instance, the carrier C may be set to function as the first output element (or second output element), upon disconnection from the crankshaft 21, in the case where the sun gear that meshes with the first pinion gear P1 is set to function as the first input element (or second input element), and the first ring gear R1 is set to function as the second input element (or first input element), as described above.

In the description above, the sun gear S is set to function as the first output element and the second ring gear R2 is set to function as the second output element. As a result, the first output element and the second output element are caused to rotate in opposite directions, upon rotation of the compound pinion gear CP, but the implementation is not limited thereto. For instance, the planetary gear train made up of the second ring gear R2, the second pinion gear P2 and the sun gear S may be configured in the form of a double pinion-type planetary gear train, so that, as a result, the first output element and the second output element are caused to rotate in the same direction upon rotation of the compound pinion gear CP. In this case as well, adjusting the number of teeth of the respective gears that make up the torque distribution mechanism 20 allows modifying the distribution ratio of the above-described engine torques T1 and T2, between an instance where the engine torque is outputted from the first output element and an instance where the engine torque is outputted from the second output element, and allows imparting a difference in the damping characteristic of torsional vibration.

The present invention is not limited to the above implementations, and, needless to say, may accommodate various modifications without departing from the spirit and scope of the invention. In the above description, the engagement region of the first clutch CL1 and the engagement region of the second clutch CL2 are divided along one frequency F2 as a boundary, but the present invention is not limited thereto, and the engagement region of the first clutch CL1 and the engagement region of the second clutch CL2 may be divided along a plurality of frequencies as boundaries, depending on the damping characteristic to be obtained. In the description above, the torque distribution mechanism 20 is made up of a planetary gear train, but the implementation is not limited thereto, and the torque distribution mechanism may be made up of bevel gears or the like.

Figure 8:
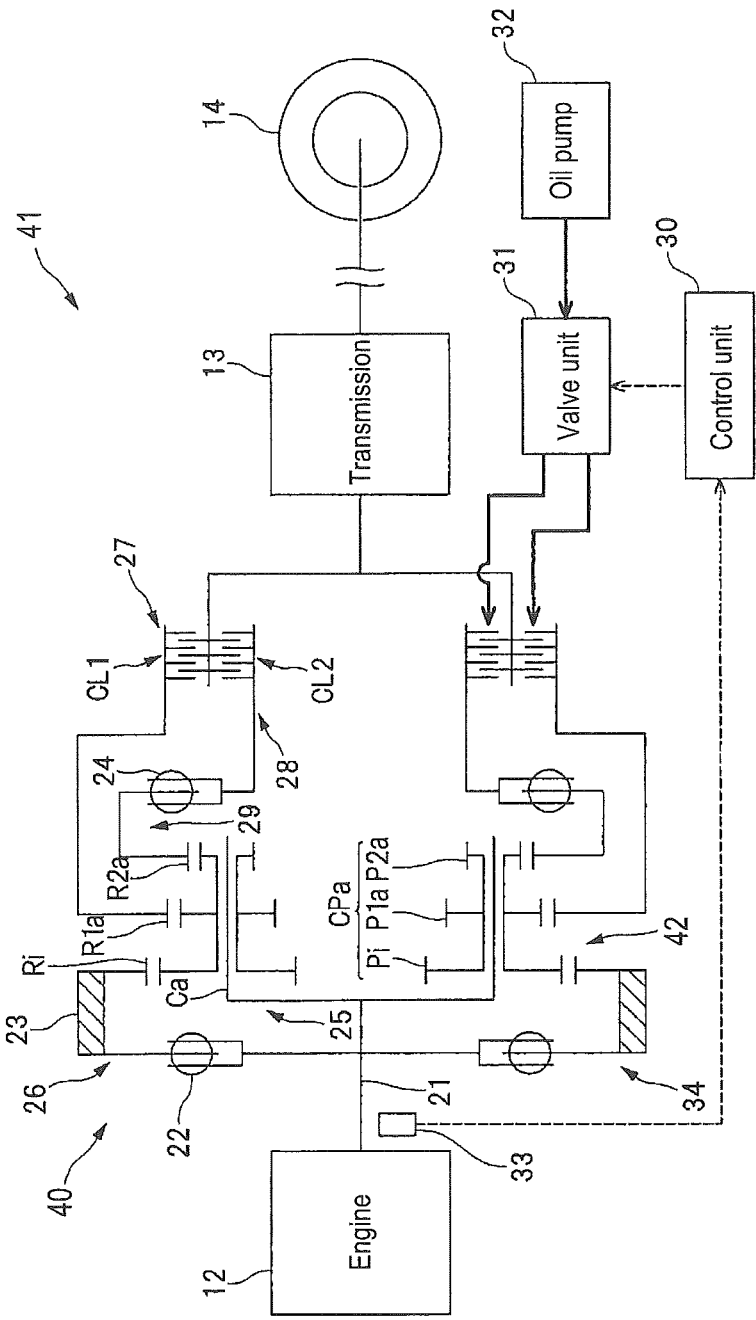
FIG. 8 is a schematic diagram illustrating a power unit comprising a damper device being a second implementation of the present invention.

FIG. 8 is a schematic diagram illustrating a power unit 41 comprising a damper device 40 being a second implementation of the present invention. In FIG. 8, members that are illustrated in FIG. 1 and members identical to those illustrated in FIG. 1 are denoted by identical reference symbols, and a recurrent description thereof will be omitted.

Figure 9:
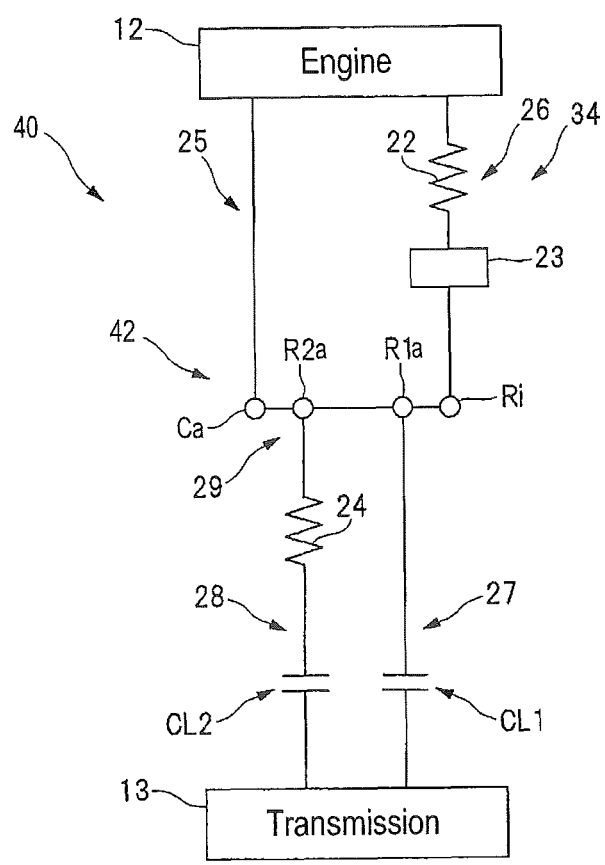
FIG. 9 is an explanatory diagram illustrating a structure model of the damper device built into the power unit.

As illustrated in FIG. 8 and FIG. 9, the damper device 40 comprises a torque distribution mechanism (planetary gear mechanism) 42 made up of a compound planetary gear train. The torque distribution mechanism 42 comprises a carrier (first input element) Ca connected with the crankshaft 21, and an input ring gear (second input element) Ri connected to the crankshaft 21 via the first spring (first elastic member) 22. The inertia member 23 having a predetermined mass is fixed to the input ring gear Ri that is connected to the crankshaft 21 via the first spring 22. The torque distribution mechanism 42 comprises a first ring gear (first output element, gear) R1a that is connected to the transmission 13, and a second ring gear (second output element, gear) R2a that is connected to the transmission 13 via the second spring (second elastic member) 24. A compound pinion gear CPa is rotatably provided on the carrier Ca. The compound pinion gear CPa is made up of an input pinion gear Pi, a first pinion gear P1a and a second pinion gear P2a. The input pinion gear Pi meshes with the input ring gear Ri, the first pinion gear P1a meshes with the first ring gear R1a, and the second pinion gear P2a meshes with the second ring gear R2a. The number of teeth of the first ring gear R1a is greater than the number of teeth of the second ring gear R2a. That is, the number of teeth of the first ring gear R1a and the number of teeth of the second ring gear R2a are dissimilar.

As described above, the torque distribution mechanism 42 is provided with two input paths 25 and 26 through which the engine torque is inputted, and two output paths 27 and 28 through which the engine torque is outputted. Specifically, the torque distribution mechanism 42 is provided with the first input path 25 through which the engine torque is inputted to the carrier Ca, and with the second input path 26 through which the engine torque is inputted to the input ring gear Ri via the first spring 22. By virtue of the first spring 22 being disposed thus in the second input path 26, the first spring 22 can as a result be stretched and compressed in response to the torsional vibration of the engine 12, and the carrier Ca and the input ring gear Ri can be caused to rotate relatively to each other. The torque distribution mechanism 42 is also provided with the first output path 27 through which the engine torque is outputted from the first ring gear R1a, and with the second output path 28 through which the engine torque is outputted from the second ring gear R2a via the second spring 24. Providing thus the second spring 24 in the second output path 28 allows bringing down the resonance point (natural frequency) of the vibration system 29, comprising the second ring gear R2a, from a high frequency region to a low frequency region, as described below. The input paths 25 and 26 and the output paths 27 and 28 are made up of rotating shafts, hub members, drum members and so forth.

Figure 10A:
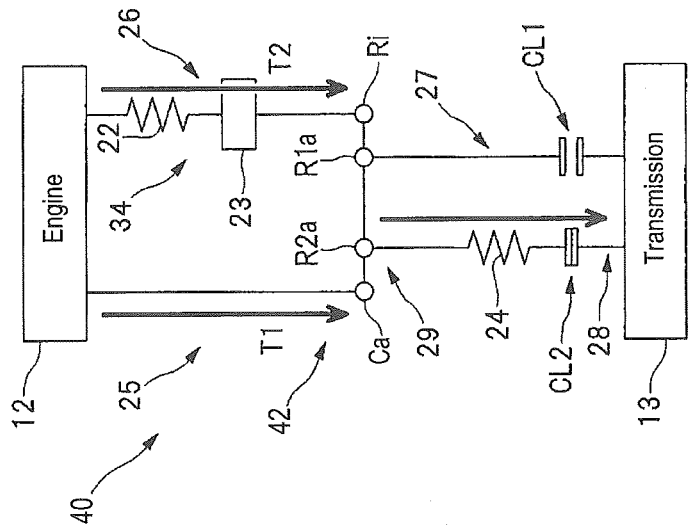
FIG. 10A and FIG. 10B are explanatory diagrams illustrating instances of transmission of engine torque.

The first clutch CL1 that is switched between the engaged state and the released state is disposed between the first ring gear R1a and the transmission 13. The first ring gear R1a becomes connected to the transmission 13 through switching of the first clutch CL1 to the engaged state, and the first ring gear R1a becomes disconnected from the transmission 13 through switching of the first clutch CL1 to the released state. In the case where the first clutch CL1 is switched to the engaged state, as illustrated in FIG. 10A, engine torques T1 and T2 that are distributed over the first input path 25 and the second input path 26 are combined via the torque distribution mechanism 42, and thereafter, the engine torques T1 and T2 are outputted through the first ring gear R1a and the first output path 27 to the transmission 13. Herein, the distribution ratio between the engine torque T1 and the engine torque T2 for canceling out the torque variation of the engine torque T1 is set on the basis of the number of teeth of the input ring gear Ri, the input pinion gear Pi, the first ring gear R1a and the first pinion gear P1a.

Figure 10B:
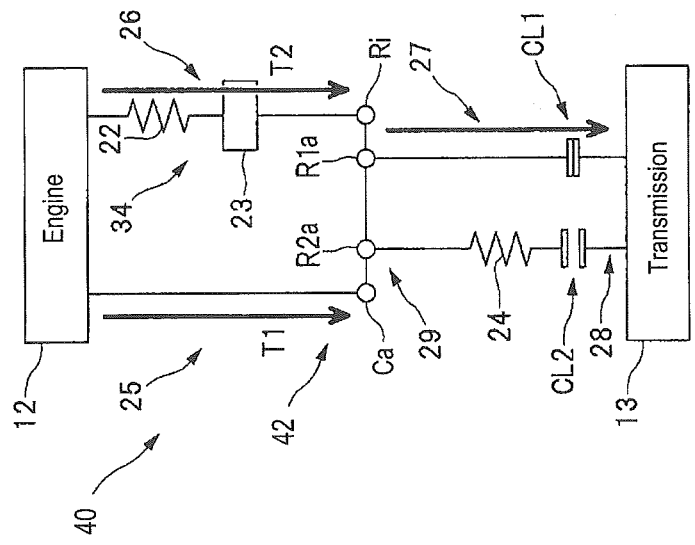

Similarly, the second clutch CL2 that is switched between the engaged state and the released state is disposed between the second ring gear R2a and the transmission 13. The second ring gear R2a becomes connected to the transmission 13 through switching of the second clutch CL2 to the engaged state, and becomes disconnected from the transmission 13 through switching of the second clutch CL2 to the released state. In the case where the second clutch CL2 is switched to the engaged state, as illustrated in FIG. 10B, the engine torques T1 and T2 that are distributed over the first input path 25 and the second input path 26 are combined via the torque distribution mechanism 42, and thereafter, the engine torques T1 and T2 are outputted through the second ring gear R2a and the second output path 28 to the transmission 13. Herein, the distribution ratio between the engine torque T1 and the engine torque T2 for canceling out the torque variation of the engine torque T1 is set on the basis of the number of teeth of the input ring gear R1, the input pinion gear Pi, the second ring gear R2a and the second pinion gear P2a.

As illustrated in FIG. 8, the control unit 30 that functions as a clutch controller is provided in the power unit 41, with a view to controlling the first clutch CL1 and the second clutch CL2 of the damper device 40. The power unit 41 is provided with the valve unit 31 that comprises a plurality of electromagnetic valves, and with the oil pump 32 that pumps hydraulic oil towards the valve unit 31. The engine revolutions sensor 33 that detects the rotational speed (hereafter notated as engine revolutions) of the crankshaft 21 is connected to the control unit 30. The control unit 30 selects the clutch CL1 and CL2 that is to be switched to the engaged state, on the basis of the engine revolutions detected by the engine revolutions sensor 33, and outputs a control signal to the valve unit 31. On the basis of the engine revolutions, specifically, the control unit 30 switches the first clutch CL1 or the second clutch CL2 to the engaged state, and selects thereby the output paths 27 or 28 for extracting the engine torque. The control unit 30 is made up of, for instance, a CPU that computes control signals and the like, a ROM that stores a control program, arithmetic expressions, map data and the like, and a RAM that stores data temporarily.

Figure 11:
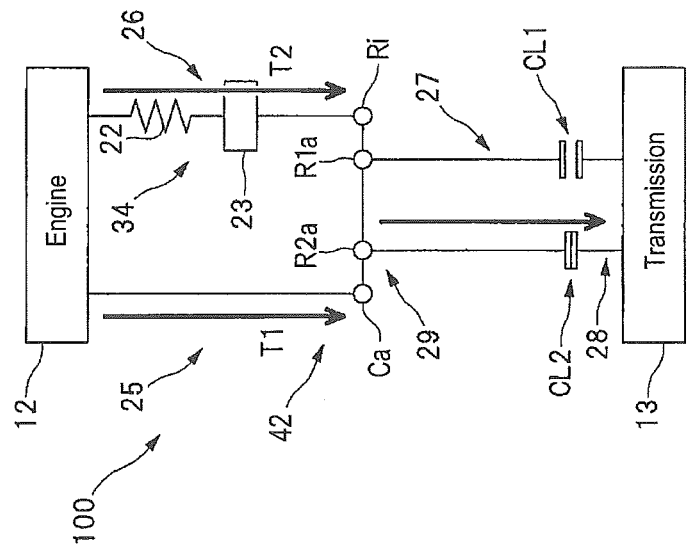
FIG. 11 is an explanatory diagram illustrating a structure model of a damper device, as a comparative example, wherein a second spring is omitted from a second output path.
Figure 12:
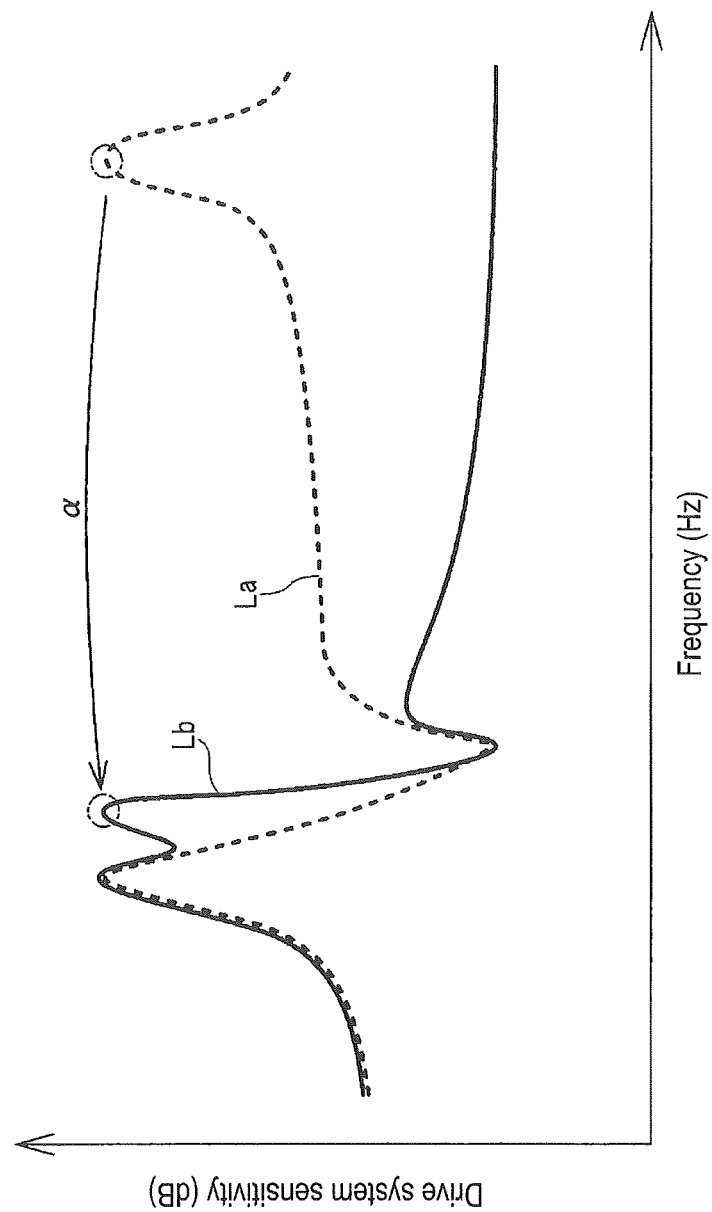
FIG. 12 is an image diagram illustrating a damping characteristic of torsional vibration outputted through the second output path.

FIG. 11 is an explanatory diagram illustrating a structure model of a damper device 200, as a comparative example, in which the second spring 24 has been omitted from the second output path 28. In FIG. 11, members that are illustrated in FIG. 10B and members identical to those illustrated in FIG. 10B are denoted by identical reference symbols, and a recurrent description thereof will be omitted. FIG. 12 is an image diagram illustrating a damping characteristic of torsional vibration outputted through the second output path 28. In FIG. 12, the abscissa axis represents vibration frequency, i.e. the frequency, of torsional vibration, and the ordinate axis represents drive system sensitivity, being the vibration acceleration level of torsional vibration. In FIG. 12, the characteristic line La represented by a dotted line denotes the damping characteristic of torsional vibration outputted through the second output path 28 of the structure model described FIG. 11. In FIG. 12, the characteristic line Lb represented by a dotted line denotes the damping characteristic of torsional vibration outputted through the second output path 28 of the structure model described FIG. 10B above.

In the case where the second spring 24 is omitted from the second output path 28, as illustrated in FIG. 11, the torsional vibration is damped at a medium frequency region, but is amplified at a low frequency region and a high frequency region, as indicated by the characteristic line La in FIG. 12. A resonance point of the vibration system 34 comprising the first spring 22, the first ring gear R1a and the inertia member 23 is present at the low frequency region. The presence of this resonance point is one cause of amplification of torsional vibration at the low frequency region. A resonance point of the vibration system 29 comprising the second ring gear R2a, the mass whereof increases readily, is present at the high frequency region. The presence of this resonance point is one cause of amplification of torsional vibration at the high frequency region. By contrast, in the case where the second spring 24 is disposed in the second output path 28, as illustrated in FIG. 10B, torsional vibration is amplified at the low frequency region, but can be damped at the medium frequency region and the high frequency region, as indicated by the characteristic line Lb in FIG. 12. That is, the resonance point of the vibration system 29 comprising the second ring gear R2a can be brought down from the high frequency region to the low frequency region, as indicated by arrow a in FIG. 12, by providing the second spring 24 in the second output path 28.

Figure 13:
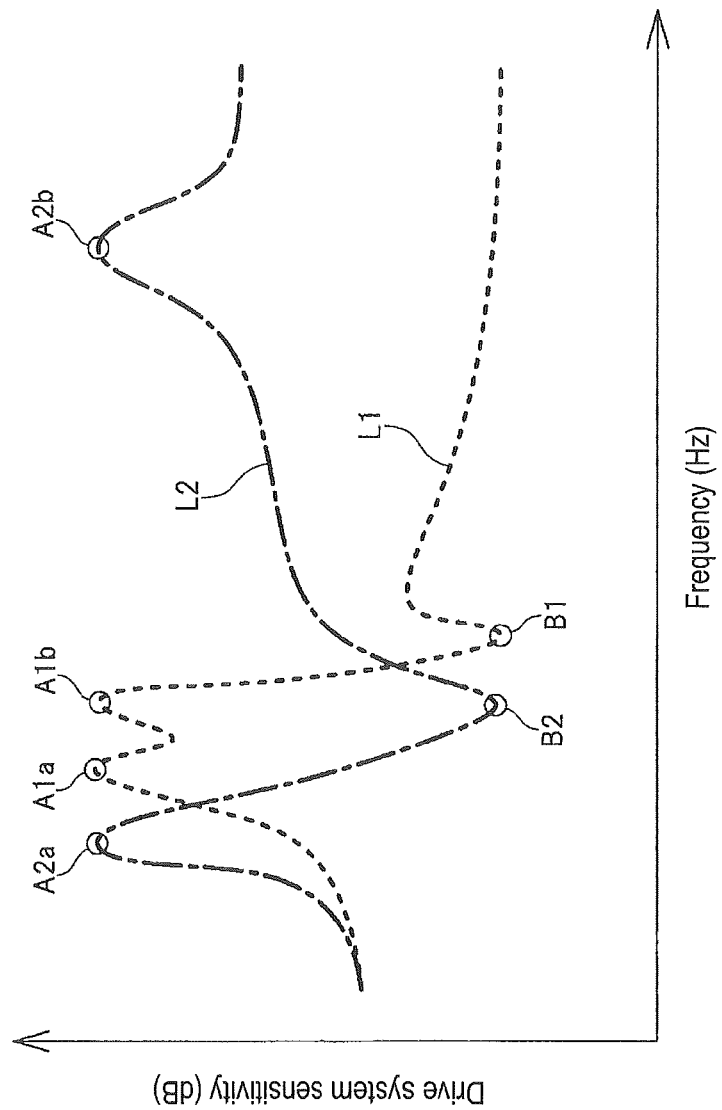
FIG. 13 is an image diagram illustrating a damping characteristic of torsional vibration by the damper device.

Next, FIG. 13 is an image diagram illustrating a torsional vibration damping characteristic of the damper device 40. In FIG. 13, the characteristic line L1 represented by a dotted line is the characteristic line Lb illustrated in FIG. 12, and denotes the damping characteristic of torsional vibration outputted from the second ring gear R2a. In FIG. 13, the characteristic line L2 represented by a dot-chain line denotes the damping characteristic of torsional vibration outputted from the first ring gear R1a.

As indicated by the characteristic line L1 of FIG. 13, torsional vibration is amplified from a low frequency region over to a high frequency region, as denoted by reference symbols A1a, A1b, and torsional vibration is damped thereafter, as denoted by reference symbol B1, in the case where the engine torque is outputted from the first ring gear R1a. That is, the rotation phases of the crankshaft 21 and of the input ring gear Ri have the same direction at a frequency region that is below the resonance point of the vibration system 34 that comprises the first spring 22, the input ring gear Ri and the inertia member 23. As a result, the crankshaft 21 and the input ring gear Ri vibrate at the same phase, and the torsional vibration is amplified. The rotation phases of the crankshaft 21 and of the input ring gear Ri have opposite directions at a frequency region beyond the resonance point of the vibration system 34. As a result, the crankshaft 21 and the input ring gear Ri vibrate at opposite phases, and torsional vibration is damped. As indicated by the characteristic line L2 of FIG. 13, torsional vibration is amplified from a low frequency region over to a high frequency region, as denoted by reference symbol A2a, torsional vibration is damped, as denoted by reference symbol B2, and torsional vibration is amplified thereafter, as denoted by reference symbol A2b, in the case where the engine torque is outputted from the second ring gear R2a. A resonance point of the vibration system comprising the first ring gear R1a is present at the high frequency region. The presence of this resonance point is one cause of the amplification of torsional vibration denoted by reference symbol A2b.

As indicated by the characteristic lines L1, L2 in FIG. 13, a difference in damping characteristic of torsional vibration arises between an instance where the engine torque is outputted from the first ring gear R1a and an instance where the engine torque is outputted from the second ring gear R2a. Specifically, the torsional vibration that is transmitted from the damper device 40 to the transmission 13 is a combination of the torsional vibration of the engine torque T1 that is inputted to the carrier Ca through the first input path 25, and the torsional vibration of the engine torque T2 that is inputted to the input ring gear Ri through the second input path 26. Herein, the amplitude and phase of vibration are mutually dissimilar between the torsional vibration of the engine torque T1 and the torsional vibration of the engine torque T2 for canceling out the torsional vibration of the engine torque T1. Accordingly, the torsional vibration outputted from the damper device 40, i.e. the torsional vibration at the time where the engine torques T1 and T2 are combined, can be caused to vary through modification of the distribution ratio of the engine torques T1 and T2.

As described above, the distribution ratio of the engine torques T1 and T2 at a time where the first clutch CL1 is engaged is determined on the basis of the number of teeth of the input ring gear Ri, the input pinion gear Pi, the first ring gear R1a and the first pinion gear P1a. The distribution ratio of the engine torques T2 and T2 at a time where the second clutch CL2 is engaged is determined on the basis of the number of teeth of the input ring gear Ri, the input pinion gear Pi, the second ring gear R2a and the second pinion gear P2a. Herein, the number of teeth of the first ring gear R1a and the number of teeth of the second ring gear R2a are dissimilar. Accordingly, it becomes possible to modify the distribution ratio of the engine torques T1 and T2 between an instance where the first clutch CL1 is engaged and an instance where the second clutch CL2 is engaged. That is, the damping characteristic of torsional vibration can be modified as a result of switching between the output paths 27 and 28 through control of the clutches CL1 and CL2.

Figure 14:
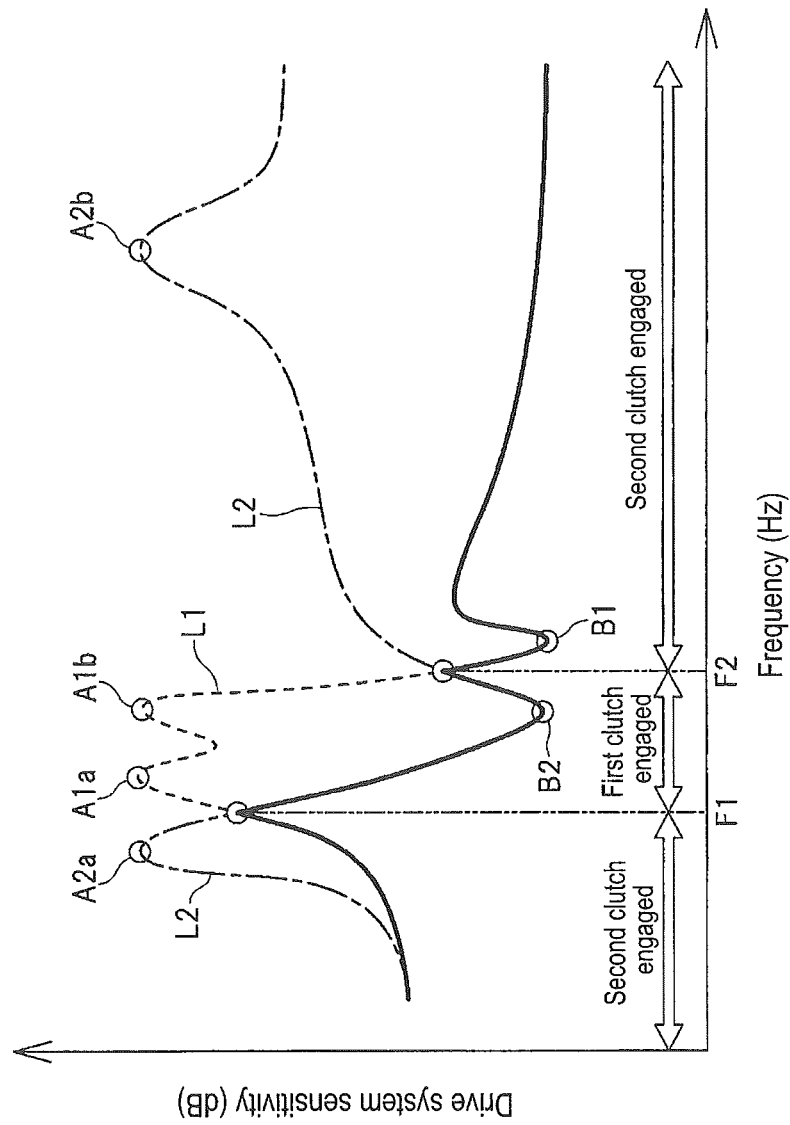
FIG. 14 is an explanatory diagram illustrating a control state of a first clutch and a second clutch.

The damping characteristic can be thus modified through switching between the output paths 27, 28. Accordingly, the control unit 30 switches the first clutch CL1 or the second clutch CL2 to the engaged state on the basis of the frequency of torsional vibration, i.e. on the basis of engine revolutions. FIG. 14 is an explanatory diagram illustrating a control state of the first clutch CL1 and the second clutch CL2. As illustrated in FIG. 14, characteristic lines L1 and L2 intersect each other at frequencies F1 and F2. The second clutch CL2 is engaged, and engine torque is outputted from the second ring gear R2a, at a frequency region below frequency F1, i.e. at a region at which engine revolutions are below revolutions corresponding to the frequency F1. The first clutch CL1 is engaged, and the engine torque is outputted from the first ring gear R1a, at a frequency region ranging from frequency F1 to frequency F2, i.e. at a region at which engine revolutions lie within a revolutions range corresponding to frequencies F1 to F2. The second clutch CL2 is engaged again, and the engine torque is outputted from the second ring gear R2a, at a frequency region beyond frequency F2, i.e. at a region at which engine revolutions exceed the revolutions corresponding to the frequency F2 of torsional vibration.

As thus explained, a favorable damping characteristic can be obtained over the entire frequency region, as illustrated by the bold line in FIG. 14, through switching of the clutches CL1 and CL2 to the engaged state, on the basis of engine revolutions. That is, a good damping characteristic can be obtained over the entire frequency region, in such a manner that inflection points A1a, A1b, A2a, and A2b on the vibration amplification side are excluded and inflection points B1, B2 on the vibration damping side are included. In particular, the resonance point of the vibration system 29 can be brought down from the high frequency region to the low frequency region by providing the second spring 24 in the second output path 28. Specifically, the resonance point of the vibration system 29 can be shifted out of the low frequency region at which the second clutch CL2 is brought to the released state, i.e. out of the use region. It becomes accordingly possible to achieve a good damping characteristic of torsional vibration over the entire frequency region. As explained above, the torsional vibration of the engine 12 can be curtailed by the damper device 40, and, as a result, vehicle quality can be enhanced through suppression of vibration and noise. The load that acts on the transmission 13 can be reduced, and the durability of the transmission 13 can be enhanced, through curtailment of the torsional vibration of the engine 12. By virtue of the curtailed vibration of the engine 12, the number of cylinders of the engine 12 can be reduced, the use region of engine revolutions can be lowered, and the fuel efficiency of the vehicle can be enhanced.

In the instance illustrated in the figure, the carrier Ca is set to function as a first input element and the input ring gear Ri is set to function as a second input element, but the implementation is not limited thereto. For instance, the input ring gear Ri may be connected directly with the crankshaft 21, and the carrier Ca may be connected to the crankshaft 21 via the first spring 22. In this case, the input ring gear Ri functions as the first input element, and the carrier Ca functions as the second input element. By providing the sun gear that meshes with the input pinion gear Pi, the sun gear may be set to function as the first input element (or second input element). Thus, the input ring gear Ri may be set to function as the second input element (or first input element), and the carrier Ca may be set to function as the second input element (or first input element), in the case where the sun gear that meshes with the input pinion gear Pi is set to function as the first input element (or second input element).

Figure 15:
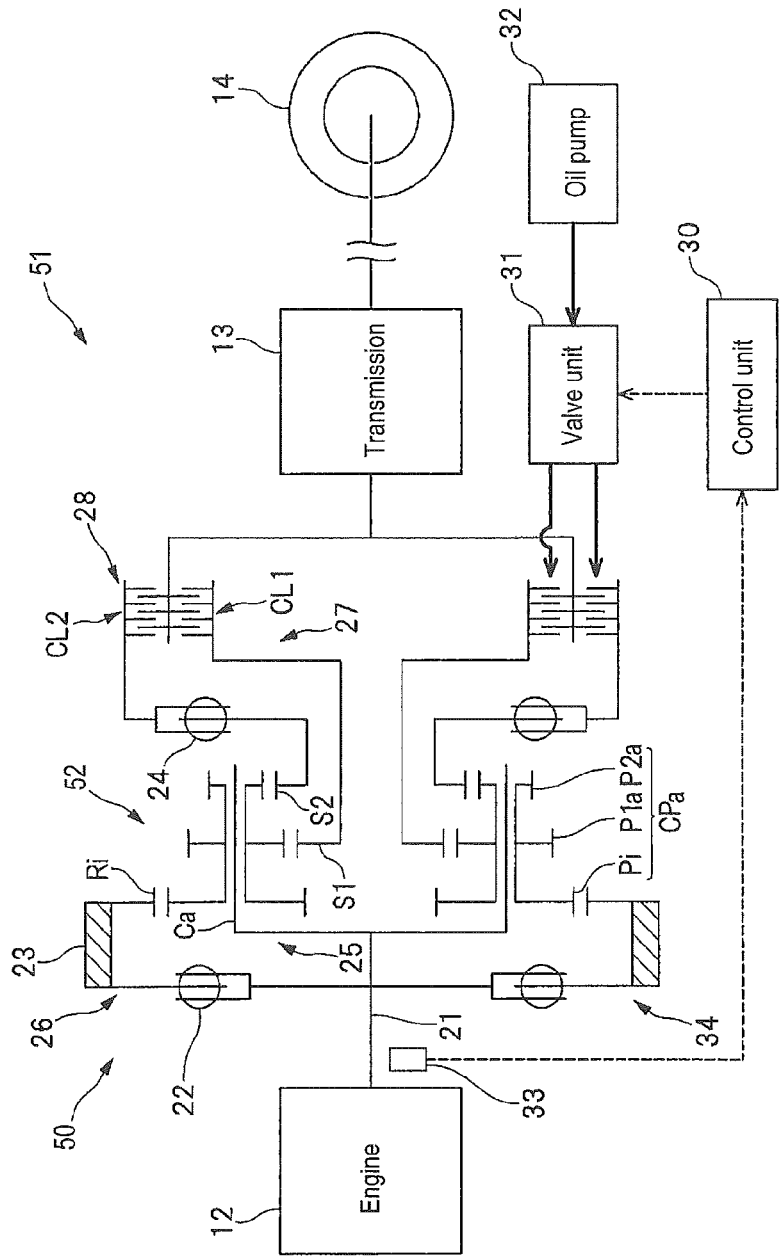
FIG. 15 is a schematic diagram illustrating a power unit comprising a damper device being another implementation of the present invention.

In the above description, the first ring gear R1a is set to function as the first output element, and the second ring gear R2a is set to function as the second output element, but the implementation is not limited thereto. FIG. 15 is a schematic diagram illustrating a power unit 51 comprising a damper device 50 being another implementation of the present invention. In FIG. 15, members that are illustrated in FIG. 8 and members identical to those illustrated in FIG. 8 are denoted by identical reference symbols, and a recurrent description thereof will be omitted.

As illustrated in FIG. 15, the damper device 50 comprises a torque distribution mechanism (planetary gear mechanism) 52. The torque distribution mechanism 52 comprises a first sun gear (first output element, gear) S1 connected to the transmission 13. The first sun gear S1 meshes with the first pinion gear P1a of the compound pinion gear CPa. The torque distribution mechanism 52 comprises a second sun gear (second output element, gear) S2 connected to the transmission 13 via the second spring 24. The second sun gear S2 meshes with the second pinion gear P2a of the compound pinion gear CP. The first clutch CL1 that is switched between the engaged state and the released state is disposed between the first sun gear S1 and the transmission 13. The second clutch CL2 that is switched between the engaged state and the released state is disposed between the second sun gear S2 and the transmission 13. The number of teeth of the first sun gear S1 and the number of teeth of the second sun gear S2 are dissimilar.

An effect identical to that of the above-described damper device 40 can be achieved by switching the first clutch CL1 or the second clutch CL2 to the engaged state, on the basis of engine revolutions, also in the case where the first sun gear S1 is set to function as the first output element and the second sun gear S2 is set to function as the second output element. Specifically, the number of teeth of the first sun gear S1 and the number of teeth of the second sun gear S2 are dissimilar; as a result, it becomes possible to modify the distribution ratio of the engine torques T1 and T2 between an instance where the first clutch CL1 is engaged and an instance where the second clutch CL2 is engaged. Thus, the damping characteristic of torsional vibration can be modified as a result of switching between the output paths 27 and 28 through control of the clutches CL1 and CL2. It becomes accordingly possible to achieve a good damping characteristic over the entire frequency region. In the description above, the second spring 24 is disposed between the second sun gear S2 and the transmission 13, but the implementation is not limited thereto, and the second spring 24 may be disposed between the first sun gear S1 and the transmission 13. In this case, the first sun gear S1 functions as the second output element, and the second sun gear S2 functions as the first output element.

Figure 16:
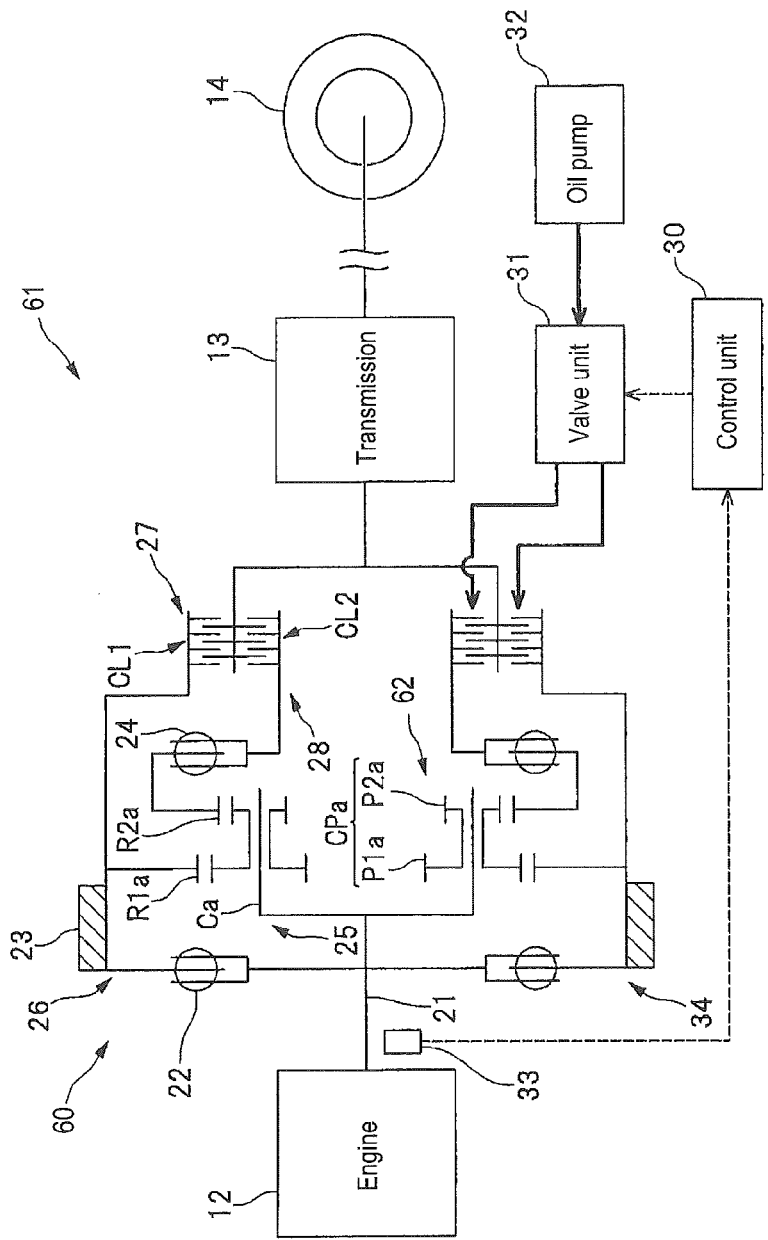
FIG. 16 is a schematic diagram illustrating a power unit comprising a damper device being another implementation of the present invention.

In the description above, the compound pinion gear CPa comprising three pinion gears Pi, P1a, and P2a is resorted to, but the implementation is not limited thereto, and a compound pinion gear may be used that comprises two pinion gears. FIG. 16 is a schematic diagram illustrating a power unit 61 comprising a damper device 60 being another implementation of the present invention. In FIG. 16, members that are illustrated in FIG. 8 and members identical to those illustrated in FIG. 8 are denoted by identical reference symbols, and a recurrent description thereof will be omitted.

As illustrated in FIG. 16, the damper device 60 comprises a torque distribution mechanism (planetary gear mechanism) 62. The torque distribution mechanism 62 comprises a carrier (first input element) Cb connected with the crankshaft 21. The torque distribution mechanism 62 comprises a first ring gear (second input element, first output element, gear) R1b one side whereof is connected to the crankshaft 21 via the first spring 22, the other side being connected to the transmission 13. The torque distribution mechanism 62 comprises a second ring gear (second output element, gear) R2b connected to the transmission 13 via the second spring 24. A compound pinion gear CPb comprising two pinion gears P1b, P2b is rotatably supported on the carrier Cb. A first pinion gear P1b of the compound pinion gear CPb meshes with the first ring gear R1b, and a second pinion gear P2b of the compound pinion gear CPb meshes with the second ring gear R2b. The first clutch CL1 that is switched between the engaged state and the released state is disposed between the first ring gear R1b and the transmission 13. The second clutch CL2 that is switched between the engaged state and the released state is disposed between the second ring gear R2b and the transmission 13. The number of teeth of the first ring gear R1b and the number of teeth of the second ring gear R2b are dissimilar.

Thus, a damping effect such as the damping effect of the above-described damper device 11 can be achieved by switching the first clutch CL1 or the second clutch CL2 to the engaged state, on the basis of engine revolutions, also in the case where the second input element and the first output element are configured integrally in the form of one ring gear Rb that meshes with the first pinion gear P1b. That is, it becomes possible obtain a damping characteristic from a combination of the inertia member 23 and the first spring 22 in the case where the first clutch CL1 is engaged, while a damping characteristic such that the distribution ratio of the engine torques T1 and T2 is modified can be achieved in the case where the second clutch CL2 is engaged. Thus, the damping characteristic of torsional vibration can be modified as a result of switching between the output paths 27 and 28 through control of the clutches CL1 and CL2. It becomes accordingly possible to achieve a good damping characteristic over the entire frequency region. In the description above, the second spring 24 is disposed between the second ring gear R2b and the transmission 13, but the implementation is not limited thereto, and the second spring 24 may be disposed between the first ring gear R1b and the transmission 13. In that case, the first ring gear R1b functions as the second output element, and the second ring gear R2b functions as the first output element.

The present invention is not limited to the above implementations, and, needless to say, may accommodate various modifications without departing from the spirit and scope of the invention. In the description above, the torque distribution mechanisms 20, 42, 52 and 62 are configured using the compound pinion gear CPa that comprises three pinion gears Pi, P1a, and P2a, or the compound pinion gear CPb that comprises two pinion gears P1b, P2b, but the implementations are not limited thereto. For instance, the torque distribution mechanisms may be configured using a compound pinion gear that comprises four or more pinion gears. In that case, a yet better damping characteristic can be achieved, over a wide frequency region, by adding a clutch and an output element such as a ring gear and/or a sun gear. In the above description, the engagement regions of the clutches CL1 and CL2 are divided along two frequencies as boundaries, but the implementations are not limited thereto, and the engagement region of the clutches CL1 and CL2 may be divided along one frequency as a boundary, or along three or more frequencies as boundaries, depending on the damping characteristic to be obtained. In the description above, the torque distribution mechanisms 20, 42, 52 and 62 are made up of planetary gear trains, but the implementations are not limited thereto, and the torque distribution mechanisms may be made up of bevel gears or the like.

The first clutch CL1 and the second clutch CL2 are not limited to hydraulic clutches that are hydraulically switched between the engaged state and the released state, and may be electromagnetic clutches that are switched between the engaged state and the released state by electromagnetic forces. The first clutch CL1 and the second clutch CL2 may be friction clutches or meshing clutches. In the above description, the elastic members are exemplified in the form of the springs 22, 24, but the implementations are not limited thereto, and rubber members may be used as elastic members.

The transmission 13 may be a manual transmission, a continuously-variable transmission, or a planetary gear-type or parallel shaft-type automatic transmission. A torque converter may be provided between the damper device 11 and the transmission 13, and a starting clutch may be provided between the damper device 11 and the transmission 13. The damper device 11 may be built into the case of the torque converter. The engine 12 is not limited to a gasoline engine, and may be a diesel engine or the like.

The invention claimed is:

1. A damper system disposed between an engine and a transmission, the damper system comprising:
    a torque distribution mechanism provided with a first input element connected to the engine, a second input element connected to the engine via a first elastic member, a first output element connected to the transmission, and a second output element connected to the transmission via a second elastic member;
    a first clutch disposed between the first output element and the transmission and switched between an engaged state of connecting the first output element to the transmission and a released state of disconnecting the first output element from the transmission; and
    a second clutch disposed between the second output element and the transmission and switched between an engaged state of connecting the second output element to the transmission and a released state of disconnecting the second output element from the transmission.

2. The damper system according to claim 1, wherein
    the first output element and the second output element comprise gears; and
    a number of teeth of the first output element and a number of teeth of the second output element are dissimilar.

3. The damper system according to claim 2, wherein with the number of teeth of the first output element being different from the number of teeth of the second output element, a distribution ratio of engine torque that is inputted to the first input element and the second input element when the first clutch is switched to the engaged state is different from a distribution ratio of engine torque that is inputted to the first input element and the second input element when the second clutch is switched to the engaged state.

4. The damper system according to claim 3, further comprising a clutch controller for switching one of the first clutch and the second clutch to the engaged state on the basis of a rotational speed of the engine.

5. The damper system according to claim 4, wherein
the torque distribution mechanism comprises a planetary gear mechanism provided with a compound pinion gear;
the first output element comprises a first ring gear meshing with a first pinion gear of the compound pinion gear; and
the second output element comprises a second ring gear meshing with a second pinion gear of the compound pinion gear.

6. The damper system according to claim 1, further comprising a clutch controller for switching one of the first clutch and the second clutch to the engaged state on the basis of a rotational speed of the engine.

7. The damper system according to claim 3, wherein
the torque distribution mechanism comprises a planetary gear mechanism provided with a compound pinion gear;
the first output element comprises a first ring gear meshing with a first pinion gear of the compound pinion gear; and
the second output element comprises a second ring gear meshing with a second pinion gear of the compound pinion gear.

8. The damper system according to claim 3, wherein
the torque distribution mechanism comprises a planetary gear mechanism provided with a compound pinion gear;
the first output element comprises a first sun gear meshing with a first pinion gear of the compound pinion gear; and
the second output element comprises a second sun gear meshing with a second pinion gear of the compound pinion gear.

9. The damper system according to claim 2, further comprising a clutch controller for switching one of the first clutch and the second clutch to the engaged state on the basis of a rotational speed of the engine.

10. The damper system according to claim 9, wherein
the torque distribution mechanism comprises a planetary gear mechanism provided with a compound pinion gear;
the first output element comprises a first ring gear meshing with a first pinion gear of the compound pinion gear; and
the second output element comprises a second ring gear meshing with a second pinion gear of the compound pinion gear.

11. The damper system according to claim 9, wherein
the torque distribution mechanism comprises a planetary gear mechanism provided with a compound pinion gear;
the first output element comprises a first sun gear meshing with a first pinion gear of the compound pinion gear; and
the second output element comprises a second sun gear meshing with a second pinion gear of the compound pinion gear.

12. The damper system according to claim 2, wherein
the torque distribution mechanism comprises a planetary gear mechanism provided with a compound pinion gear;
the first output element comprises a first ring gear meshing with a first pinion gear of the compound pinion gear; and
the second output element comprises a second ring gear meshing with a second pinion gear of the compound pinion gear.

13. The damper system according to claim 12,
wherein the compound pinion gear is rotatably supported by the first input element or the second input element.

14. The damper system according to claim 2, wherein
the torque distribution mechanism comprises a planetary gear mechanism provided with a compound pinion gear;
the first output element comprises a first sun gear meshing with a first pinion gear of the compound pinion gear; and
the second output element comprises a second sun gear meshing with a second pinion gear of the compound pinion gear.

15. The damper system according to claim 14, wherein the compound pinion gear is rotatably supported by the first input element or the second input element.

16. The damper system according to claim 4, wherein
the torque distribution mechanism comprises a planetary gear mechanism provided with a compound pinion gear;
the first output element comprises a first sun gear meshing with a first pinion gear of the compound pinion gear; and
the second output element comprises a second sun gear meshing with a second pinion gear of the compound pinion gear.

17. The damper system according to claim 6, wherein
the torque distribution mechanism comprises a planetary gear mechanism;
the first input element comprises a carrier for rotatably supporting a first pinion gear;
the second input element comprises a first ring gear meshing with the first pinion gear;
the first output element comprises a sun gear meshing with a second pinion gear that is fixed to the first pinion gear and that rotates integrally therewith; and
the second output element comprises a second ring gear meshing with the second pinion gear.

18. The damper system according to claim 1, wherein
the torque distribution mechanism comprises a planetary gear mechanism;
the first input element comprises a carrier for rotatably supporting a first pinion gear;
the second input element comprises a first ring gear meshing with the first pinion gear;
the first output element comprises a sun gear meshing with a second pinion gear that is fixed to the first pinion gear and that rotates integrally therewith; and
the second output element comprises a second ring gear meshing with the second pinion gear.

19. The damper system according to claim 1, further comprising a clutch controller for switching one of the first clutch and the second clutch to the engaged state.

20. The damper system according to claim 1, wherein the damper system is separated from the engine via a first shaft, and
wherein the damper system is separated from the transmission via a second shaft.

* * * * *